United States Patent
Sowul et al.

(10) Patent No.: US 6,948,524 B1
(45) Date of Patent: Sep. 27, 2005

(54) PRESSURE HOLDING APPARATUS FOR A TORQUE-TRANSMITTING MECHANISM

(75) Inventors: Henryk Sowul, Novi, MI (US); Michael B. Solt, Beverly Hills, MI (US); Michael A. Kozan, Canton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/801,780

(22) Filed: Mar. 16, 2004

(51) Int. Cl.[7] .......................................... F15B 13/043
(52) U.S. Cl. ........................ 137/596; 91/445; 91/447
(58) Field of Search ................... 91/445, 447; 137/596

(56) References Cited

U.S. PATENT DOCUMENTS 6,244,410 B1 * 6/2001 Bauer ......................... 91/447

* cited by examiner

Primary Examiner—Gerald A. Michalsky
(74) Attorney, Agent, or Firm—Leslie C. Hodges

(57) ABSTRACT

A pressure holding apparatus incorporates a hydraulic pressure system having an engine-driven pressure source, a pressure holding valve, and a torque-transmitting mechanism. The torque-transmitting mechanism is selectively engaged and disengaged by fluid pressure from the engine-driven pressure source during normal powertrain operation. The torque-transmitting mechanism apply chamber is pressurized with the oil by the pressure holding valve when the engine operation is discontinued.

4 Claims, 5 Drawing Sheets

PRESSURE HOLDING APPARATUS FOR A TORQUE-TRANSMITTING MECHANISM

TECHNICAL FIELD

This invention relates to pressure holding apparatus and, more particularly, to pressure holding apparatus for a torque-transmitting mechanism in a hybrid powertrain.

BACKGROUND OF THE INVENTION

Vehicles utilizing hybrid powertrain systems incorporate an engine stop-start function. When the vehicle is stopped in traffic, for example, at traffic lights or slow-moving traffic, the engine operation is discontinued. However, when it is desired to begin moving the vehicle after the stop, the engine must start and the vehicle must begin moving in a substantially seamless manner. There is to be no delay when the operator wishes to accelerate the vehicle along with the remainder of traffic.

The ability to stop and restart the engine improves the overall economy of the vehicle especially in fuel economy. Most hybrid systems will employ at least one torque-transmitting mechanism, such as a clutch or brake, which is engaged when the vehicle is to be launched or begin operation from a stopped position. The time required to fill a servomechanism operating the torque-transmitting mechanism quite generally causes a delay between the engine starting and the vehicle beginning to move.

The hybrid type powertrains, which have been disclosed in the prior art, include a separate hydraulic pump, which is operated to maintain the torque-transmitting mechanism engaged while the engine is not running. When the engine is running, the auxiliary pump operation is discontinued and the more conventional engine-driven system pump operated. While these systems permit the engine operation to be discontinued, the use of a separate pump is energy consuming, space consuming, and more expensive.

The space and mass considerations of the additional pumping mechanism are probably the most serious penalties that are associated with this solution. The space under the vehicle where the powertrain is positioned is very sparse and the addition of any expansion causing assemblies is detrimental or least desirable to the system. Also, the addition of a separate pump mechanism creates an increase in mass for the vehicle and an increased cost.

SUMMARY OF THE INVENTION

It is an object of the present invention to provide an improved pressure holding apparatus for a hybrid powertrain.

In one aspect of the present invention, a pressure holding valve is disposed between the fluid pressure supply system and the torque-transmitting mechanism to be maintained engaged during engine stop.

In another aspect of the present invention, the pressure holding valve is electrically actuated by a solenoid mechanism when engine operation is discontinued.

In yet another aspect of the present invention, the pressure holding valve is maintained by a mechanical mechanism, such as a spring.

In a further aspect of the present invention, the electrical actuation is accomplished by a solenoid mechanism surrounding a portion of a valve mechanism, which is slidably positioned to control fluid flow to the torque-transmitting mechanism.

In a yet further aspect of the present invention, a hydraulic system, which supplies fluid pressure to the holding valve, includes an accumulator to maintain excess oil at the input side of the holding valve.

DESCRIPTION OF THE EXEMPLARY EMBODIMENTS

Figure 1:
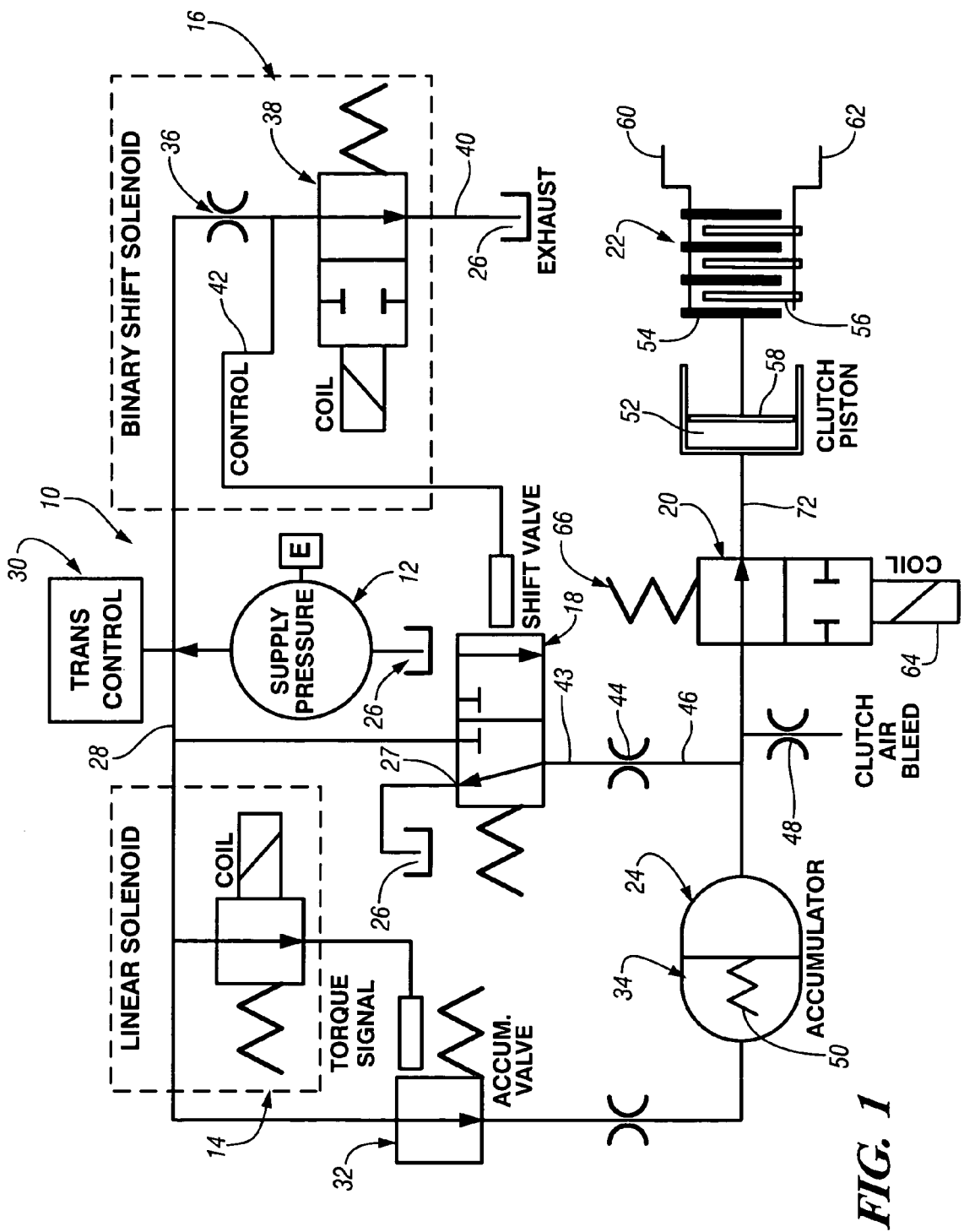
FIG. 1 is a diagrammatic representation of a portion of a hydraulic control system incorporating the present invention.

Referring to the drawings, wherein like characters represent the same or corresponding parts throughout the several views, there is seen in FIG. 1 a portion of a hydraulic control system or mechanism 10 including a hydraulic pump 12, a torque sensitive valve 14, a shift control valve 16, a shift valve 18, a pressure holding valve 20, a torque-transmitting mechanism 22, and an accumulator 24.

The pump 12 is driven by engine, not shown. During operation, the pump 12 drives fluid from a reservoir or sump 26 for delivery to a main pressure passage 28, which is connected with the torque sensitive valve 14, the shift control valve 16, and the remainder of a transmission control 30. The transmission control 30 is a conventional control mechanism having a plurality of valves and other hydraulic mechanisms, which are operable to control various torque-transmitting mechanisms in the powertrain. The transmission control 30 also will include a conventional electronic control module (ECM), which may include a programmable digital computer. The electronic control module supplies electronic signals to both the torque sensitive valve 14 and the shift control valve 16.

The main passage 28 also is connected through an accumulator valve 32, which is controlled by the torque sensitive valve 14 to control fluid flow through a control bias chamber 34 of the accumulator 24. The fluid pressure supplied to the torque sensitive valve 14 is distributed to a control mechanism for the accumulator valve 32.

The shift control valve 16 also receives pressurized fluid through a restriction 36 from the main passage 28. The shift control valve 16 has a valve member 38, which is operable under the influence of a solenoid to control fluid flow to an exhaust passage 40 or to a control passage 42. The control passage 42 distributes a signal to the shift valve 18. The shift valve 18 is a two-position valve, which controls fluid flow from the main passage 28 to a clutch feed passage 43.

In the position shown, the valve 18 is preventing flow from the passage 28 to the passage 43 while connecting the passage 43 to the reservoir or sump 26. When the shift valve 18 is actuated by the shift control valve 16, the fluid pressure in passage 28 is directed through the valve 18 to the passage 43, which is connected through a restriction 44 with a torque-transmitter apply passage 46. The torque-transmitter apply passage 46 communicates with the accumulator and the pressure holding valve 20. The passage 46 also has an air bleed control restriction 48.

Pressure in the accumulator 24 is controlled by pressure in the control side bias chamber 34 and a spring 50 contained therein. The pressure holding valve 20 is an electronically operated two-position valve, which is positionable to distribute fluid from passage 46 to an apply chamber 52 of the torque-transmitting mechanism 22. In the solenoid set position, the valve 20 is effective to prevent fluid flow from the apply chamber 52 back through the system to exhaust at the reservoir 26 through a port 27 in the shift valve 18.

The torque-transmitting mechanism 22 has a plurality of friction plates 54, which are interdigitated with friction plates 56. The fluid pressure in the apply chamber 52 energizes a piston 58 to enforce frictional engagement between the plates 54 and 56 such that a pair of hub members 60 and 62 will be interconnected.

In the transmission mechanism of the powertrain, the members 60 and 62 are generally connected with gear members and/or between the input shaft of the gear member of the planetary gear mechanism to maintain a predetermined torque path through the transmission. The operation of such torque-transmitting mechanisms is well known to those skilled in the art of transmission operation.

When the engine is running and the torque-transmitting mechanism 22 is desired to be engaged, the shift valve 18 will be energized to direct fluid pressure to the passage 43 and then to the passage 46. The pressure holding valve 20 will be in the spring set position shown, such that fluid pressure will enter the apply chamber 52 to enforce the piston 58 to engage the friction plates 54 and 56 and the torque-transmitting mechanism 22 will be engaged. This would generally occur in at least the first forward ratio and the reverse ratio of the powertrain.

When the engine operation is discontinued, for example, when the vehicle comes to a stop, the valve 20 is electronically actuated by a solenoid mechanism 64 to block exhaust of fluid pressure from the apply chamber 52. The controlled value of the residual oil pressure in chamber 52 may be calibrated by solenoid characteristic and return spring 66 rate. While the engine is not running, the torque transmitting device should maintain its torque capacity close to zero—the apply chamber 52 should be filled with low pressure oil.

When the operator depresses the throttle mechanism of a vehicle to begin motion thereof, the solenoid mechanism 64 is de-energized and fluid pressure is again delivered from the pump 12 to maintain the engagement of the torque-transmitting mechanism 22. Thus, while the vehicle is starting under engine operation, the transmission is conditioned for the desired operation.

With the hybrid powertrain permits electric motor only drive as well as combustion engine operation, the vehicle is still conditioned to begin operation and the solenoid 64 can remain engaged until the pressure supply from pump 12 is brought back into operating condition.

Figure 2:
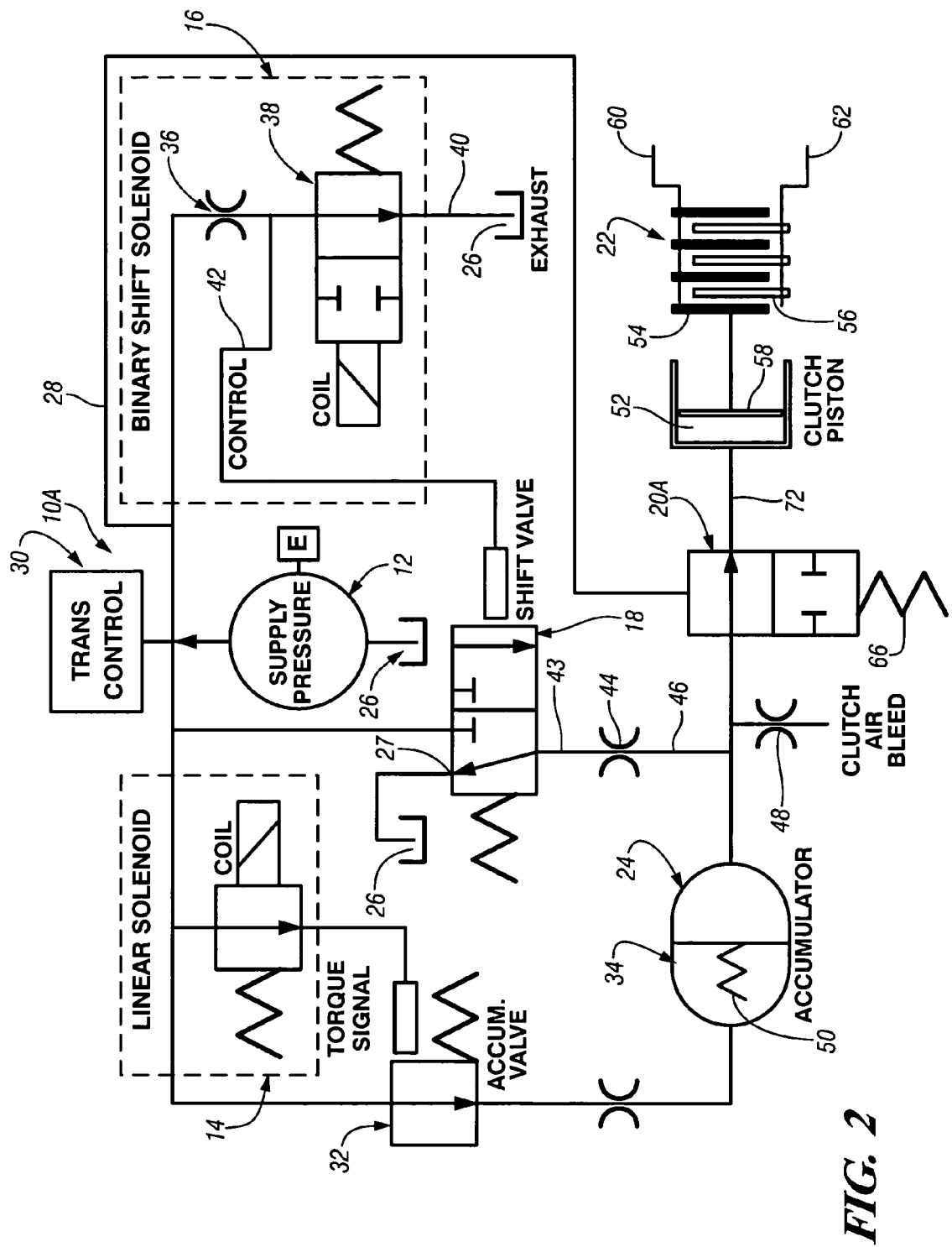
FIG. 2 is a block diagram of a hydraulic control system incorporating another embodiment of the present invention.

The hydraulic control system 10A, shown in FIG. 2, includes many of the same components described above for FIG. 1. The primary difference between the systems shown in FIGS. 1 and 2 is the control of the pressure holding valve 20 in FIG. 1 and the pressure holding valve 20A in FIG. 2. The pressure holding valve 20A in FIG. 2 is a hydraulically controlled valve. The pressure holding valve 20A receives fluid pressure from the main passage 28 to position the valve 20A such that fluid pressure in passage 46 is directed through the valve 20A to the apply chamber 52 of the torque-transmitting mechanism 22.

When the engine operation is ceased, as described above, the valve 20A assumes the spring set position established by a control spring 66 to position the valve 20A to block fluid flow from the apply chamber 52 to exhaust through the valve 18 to the reservoir 26. Thus, the operation of the hydraulic control system 10A is substantially the same as the hydraulic control system 10. The valves 20 and 20A are open to permit fluid flow in two directions to the apply chamber 52 when the vehicle engine is operating and are operated to close the communication with the apply chamber 52 when engine operation is decreased thereby maintaining the fluid pressure within the apply chamber 52 for a period of time to permit restarting of the vehicle when the operator so desires.

Figure 3:
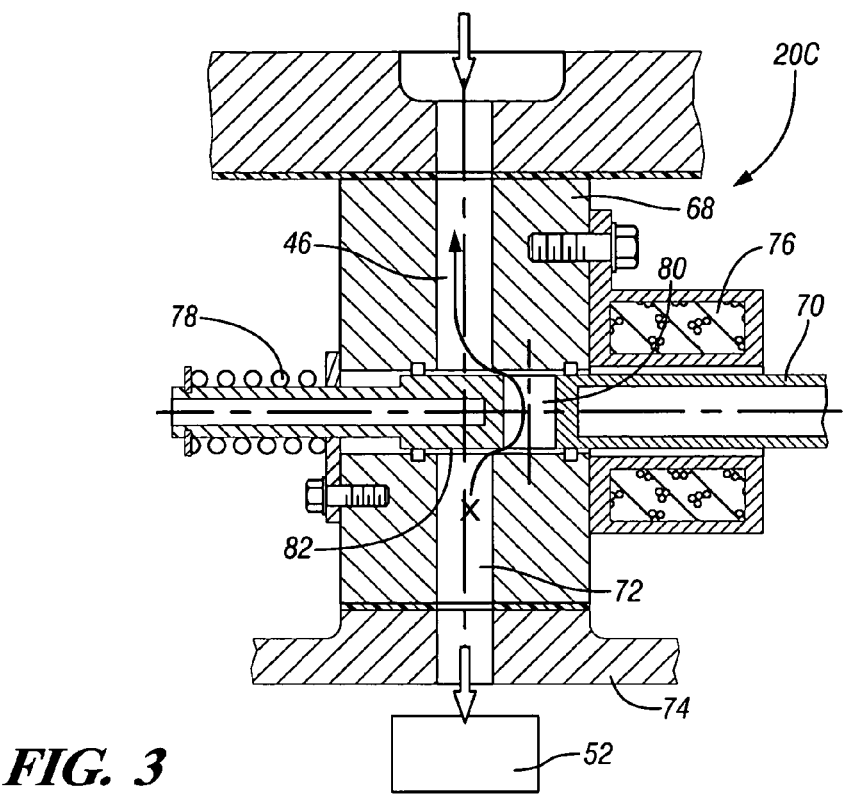
FIG. 3 is an elevational view of one holding valve mechanism utilized with the present invention.

A pressure holding valve 20C is shown in FIG. 3. The pressure holding valve 20C has a valve housing 68 in which is slidably disposed a valve spool 70. The valve spool 70 is operable to control fluid pressure between the passage 46 formed in the valve housing 68 and a passage 72 also formed in the valve body 68. The passage 72 is connected through a plate member 74 to a passage connected with the torque-transmitting mechanism 22. The passage 46 is connected as shown in FIG. 1 with the shift valve 18.

A solenoid coil 76 surrounds a portion of the valve spool 70, which is urged leftward by a control spring 78. The valve spool 70 has a passage 80 formed therein, which is operable to communicate passage 46 with passage 72. In the position shown, the solenoid 76 has been energized such that fluid flow between the passage 46 and the passage 72 is restricted by a portion 82 of the valve spool 70. This would indicate that the vehicle engine operation has been discontinued. When the vehicle engine is restarted, the solenoid 76 is de-energized such that the spring 78 will position the valve spool 70 to provide fluid connection between the passages 46 and 72 when fluid pressure from the pump 12 is delivered to the chamber 52 of the torque-transmitting mechanism 22 (see FIG. 1).

Figure 4:
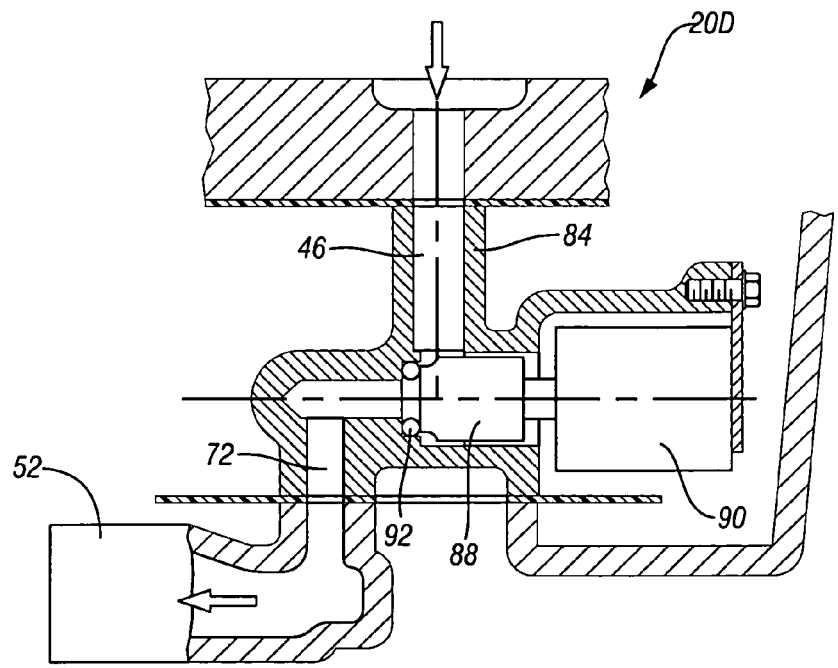
FIG. 4 is another embodiment of a holding valve incorporated in the present invention.

A pressure holding valve 20D is shown in FIG. 4. The pressure holding valve 20D includes a valve housing 84 with the passage 46 formed therein as well as the passage 72. The pressurized flow between passages 46 and 72 is controlled by a plug valve 88, which is positioned in operation by a conventional solenoid mechanism 90. When the solenoid mechanism 90 is energized, the plug valve 88 is moved to the position shown in FIG. 4 thereby discontinuing fluid flow between the passages 46 and 72. During engine operation, the solenoid 90 is de-energized and a spring member, not shown, in the solenoid 90 moves the plug valve 88 rightward thereby permitting fluid flow between the passage 46 and the torque-transmitting mechanism 22. The plug valve 88 shown in FIG. 4 employs an O-ring seal 92 such that positive closing of the passage 46 to the passage 72 is accomplished.

The pressure holding valve 20C shown in FIG. 3 is a conventional sliding valve type mechanism having sliding seal fits, which can prevent the apply oil leakage when solenoid is de-energized. Some oil leakage from chamber 52 (see FIG. 1 and FIG. 2) through the valve clearance is possible when solenoid is energized—see FIG. 3, path X. If the engine stop operation is excessively extended, the system shown in FIG. 3 will bleed down and perhaps permit disengagement of the torque-transmitting mechanism 22. However, this would not happen during normal vehicle operation.

When the operation of the vehicle electrical system is discontinued, such as when the operator desires to leave the vehicle, the control valves 20C and 20D will be, of course, opened by the spring members to permit the torque-transmitting mechanism 22 to disengage.

Figure 5:
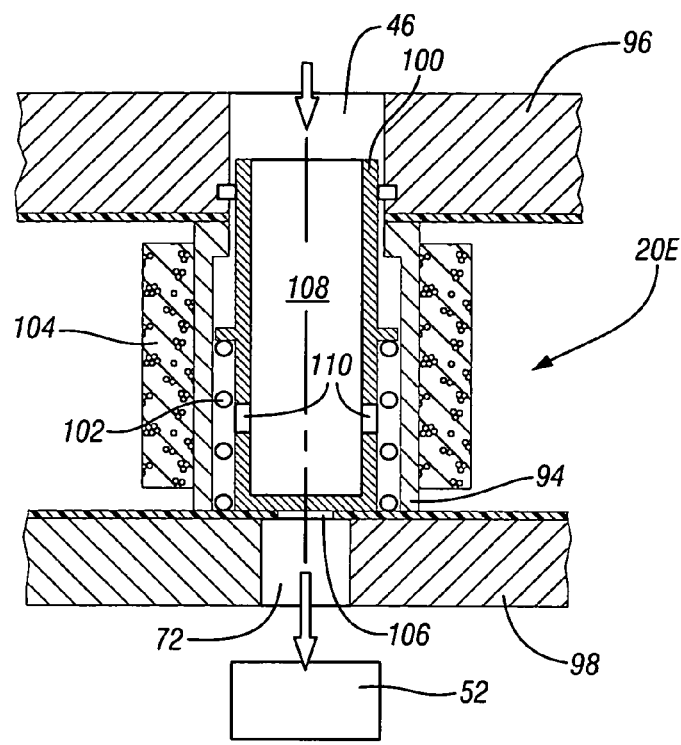
FIG. 5 is a further embodiment of a holding valve employed in the present invention.

The pressure holding valve mechanism 20E shown in FIG. 5 has a valve housing portion 94 disposed between a pair of plates 96 and 98. A valve spool 100 is slidably disposed within the valve housing 94 and urged upwardly therein by a spring 102. The valve housing 94 is surrounded by a solenoid coil 104, which when energized will urge the valve spool 100 downward against the spring 102 to prevent fluid communication between the passage 46 and the passage 72.

A seal 106 provides a positive seal between the valve spool 100 and the plate 98 surrounding passage 72. The seal 106 can, of course, be bonded directly to the valve spool 100. When the solenoid 104 is de-energized, the spring 102 urges the valve spool 100 upwardly, such that fluid flow into a central passage 108 passes through radial openings 110 into the chamber containing the spring 102 and thence through the passage 72 to the chamber 52 of the torque-transmitting mechanism 22. Since a positive seal 106 is employed in this system, leakage from the torque-transmitting mechanism 22 to exhaust is essentially zero, therefore the torque-transmitting mechanism 22 apply circuit will remain filled with the oil through engine stop operation.

Figure 6:
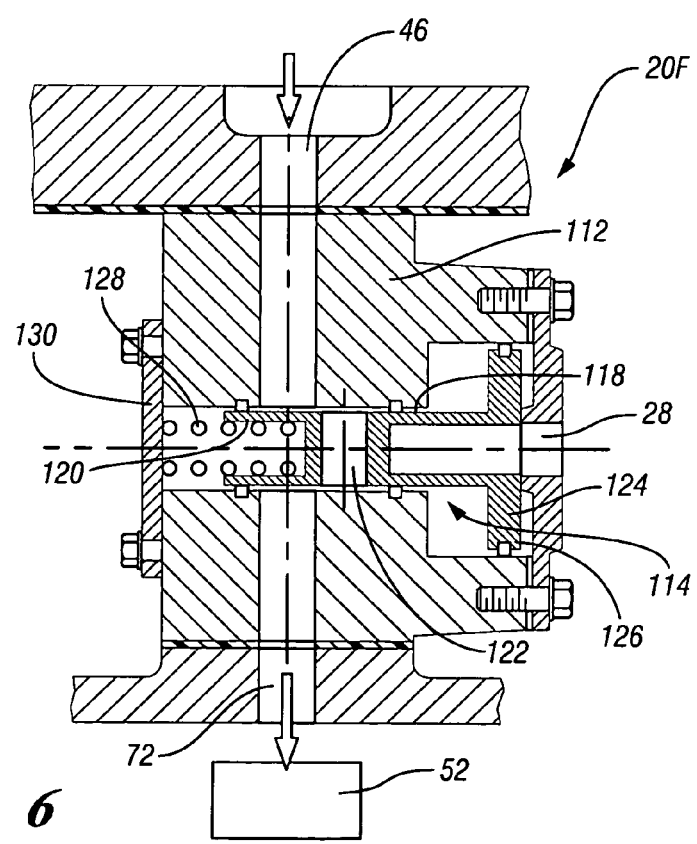
FIG. 6 is a still further embodiment of the valve mechanism employed in the present invention.

A pressure holding valve 20F shown in FIG. 6 is a hydraulically actuated valve. The valve 20F includes a valve housing 112 in which is slidably disposed a valve member 114. The valve housing 112 communicates passage 46 with the passage 72, which in turn is connected with the chamber 52 of the torque-transmitting mechanism 22. The valve member 114 includes a stem portion 118 having a spring pocket 120, a passage 122, and a pressure control piston 124. The pressure control piston 124 has adjacent thereto an area 126, which is communicated with the main pressure passage 28. A spring 128 is disposed within the spring pocket 120 and positioned at one end by a plate 130. The spring 128 pushes the valve member 114 rightward as viewed in FIG. 6 to block fluid flow from the torque-transmitting mechanism 22 back through the exhaust port 27 of the valve 18—see FIG. 1 and FIG. 2.

When the engine is operating, line pressure in passage 28 is present. This pressure will operate on the piston 124 to cause the valve member 114 to move leftward against the spring 128 thereby communicating passage 46 with passage 72 in turn to permit conventional energization of the torque-transmitting mechanism 22.

The basic difference between valve 20F and the valves 20C, 20D, and 20E shown in FIGS. 3, 4, and 5, is the method of actuation. The valve 20F is hydraulically actuated while the valves 20C, 20D, and 20F, previously described, are all electronically or electrically actuated.

Figure 7:
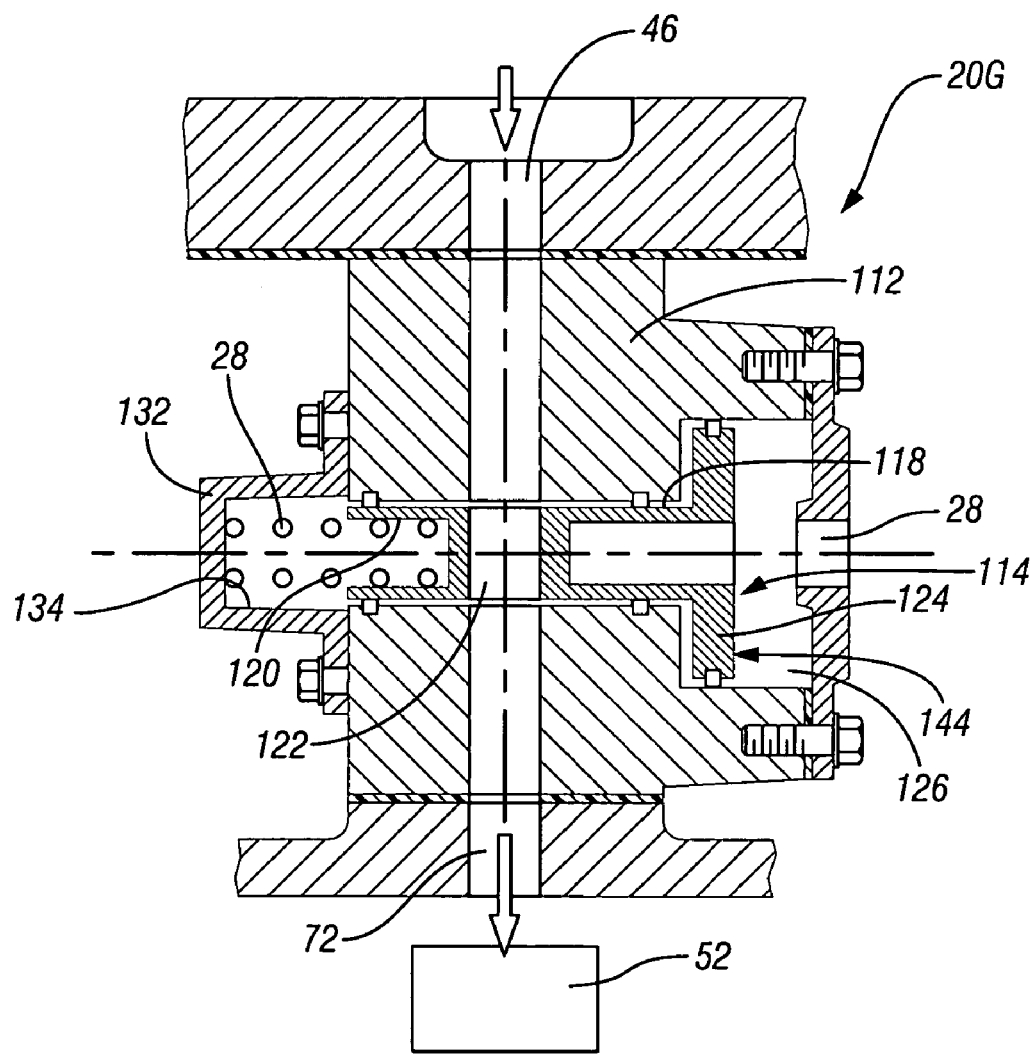
FIG. 7 is an embodiment similar to FIG. 6 wherein the spring mechanism has an extended pocket for disposal thereof.

A pressure holding valve 20G shown in FIG. 7 is substantially identical with the pressure holding valve 20F shown in FIG. 6. The primary difference between valves 20F and 20G is the construction of the spring pocket for the spring 128. In valve 20G, a pocket extension 132 is secured to the valve housing 112. The pocket extension 132 has a recess 134 in which a portion of the spring 128 is contained. The use of the extended spring pocket permits for a simpler or easier spring design since the length of the spring can be increased, that is extra room provided. This simplifies the spring design.

The valve member 114 shown in FIG. 7 is shown in the pressure set position wherein fluid pressure in passage 28 has been admitted to the area 126 thereby operating on the piston 124 to urge the valve member 114 leftward into spring pocket 120 to provide fluid communication between the passages 46 and 72 through the passage 122. This is the condition that exists when the engine is running and the pump 12 is supplying fluid pressure to passage 28.

When engine operation is discontinued, such as at a stop sign, the pressure in passage 28 is decreased to zero and the spring 128 pushes the valve member 114 rightward thereby discontinuing free communication between the passages 46 and 72 such that the torque-transmitting mechanism 22 will remain engaged.

Each of the pressure holding valves 20C, 20D, 20E, 20F, and 20G provide an identical function. That is, in one operating condition, they prevent fluid flow from the torque-transmitting mechanism 22 to an exhaust mechanism and in the other operating position they permit fluid flow from a system supply pressure to the torque-transmitting mechanism 22 when desired or operable by the transmission control system.

What is claimed is:

1. A pressure holding apparatus for a torque-transmitting mechanism comprising:
   a source of fluid pressure from an engine-driven pressure source;
   at least one valve mechanism for connecting a supply of oil from said pressure source to a pressure holding valve;
   said pressure holding valve including a valve mechanism having a first operating position for distributing fluid pressure from said fluid pressure source to a torque-transmitting mechanism engaging system and a second operating position for preventing fluid flow from said torque-transmitting mechanism to an exhaust mechanism, said second operating position being conditioned by the ceasing of operation of said engine-driven pressure source.

2. The pressure holding apparatus defined in claim 1 further wherein:
   said operating position of pressure holding valve is either a spring set position or a control set position.

3. The pressure holding apparatus defined in claim 2 further wherein:
   a spring mechanism is operable to position said valve mechanism in said second operating position and a selectively operable control mechanism is operable to position said valve in said first position.

4. The pressure holding apparatus defined in claim 2 further wherein:
   a spring member is operable to position said valve mechanism in said first operating position and a selectively operable control mechanism is energized to position said valve mechanism in said second operating position.

* * * * *